United States Patent
Auchere et al.

(10) Patent No.: US 10,663,611 B2
(45) Date of Patent: May 26, 2020

(54) METHODS AND SYSTEMS FOR NON-CONTACT VIBRATION MEASUREMENTS

(71) Applicant: Schlumberger Technology Corporation, Sugar Land, TX (US)

(72) Inventors: Jean-Christophe Auchere, Tokyo (JP); Henri-Pierre Valero, Paris (FR); Remi Ounadjela, Cambridge, MA (US); Hiroshi Nakajima, Sagamihara (JP); Alexis Pibrac, Montréal (CA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 342 days.

(21) Appl. No.: 15/543,250

(22) PCT Filed: Jan. 15, 2016

(86) PCT No.: PCT/US2016/013505
§ 371 (c)(1),
(2) Date: Jul. 13, 2017

(87) PCT Pub. No.: WO2016/115411
PCT Pub. Date: Jul. 21, 2016

(65) Prior Publication Data
US 2017/0371059 A1 Dec. 28, 2017

Related U.S. Application Data

(60) Provisional application No. 62/103,974, filed on Jan. 15, 2015.

(51) Int. Cl.
*G01V 1/50* (2006.01)
*G01V 1/46* (2006.01)
(Continued)

(52) U.S. Cl.
CPC ............... *G01V 1/50* (2013.01); *E21B 49/00* (2013.01); *G01V 1/46* (2013.01); *G01V 3/28* (2013.01);
(Continued)

(58) Field of Classification Search
CPC ..... G01V 1/50; G01V 1/46; G01V 3/28; G01V 2210/161; E21B 49/00; E21B 47/12
See application file for complete search history.

(56) References Cited

U.S. PATENT DOCUMENTS 6,094,401 A   7/2000 Masak et al.
7,467,685 B2 * 12/2008 Shehab .................... G01V 1/04
                                                                   181/108

(Continued)

OTHER PUBLICATIONS

J.H. Moran and K.S. Kunz, "Basic Theory of Induction Logging and Application to Study of Two-Coil Sondes", Geophysics vol. 27, No. 6, Part 1, (Dec. 1962), pp. 829-858.

(Continued)

*Primary Examiner* — Krystine E Breier
(74) *Attorney, Agent, or Firm* — Eileen Pape

(57) ABSTRACT

Methods and systems of measuring acoustic signals via a borehole wall are disclosed. One or more non-contact magneto-dynamic sensors are configured or designed for deployment at at least one depth in a borehole. The magneto-dynamic sensor comprises a coil excited by an electric current and a circuitry for outputting a signal corresponding to a time-varying impedance of the coil. A processor is configured to perform signal processing for deriving at least one of a magnitude or a frequency of vibration of the borehole wall based on the output signal from the circuitry.

18 Claims, 7 Drawing Sheets

(51) Int. Cl.
  *E21B 49/00* (2006.01)
  *G01V 3/28* (2006.01)
  *E21B 47/12* (2012.01)
(52) U.S. Cl.
  CPC ........ *E21B 47/12* (2013.01); *G01V 2210/161* (2013.01)

(56) References Cited

U.S. PATENT DOCUMENTS

| | | | | |
|---|---|---|---|---|
| 7,535,795 | B2* | 5/2009 | Varsamis | G01V 11/002 |
| | | | | 340/853.3 |
| 7,757,552 | B2* | 7/2010 | Bogath | E21B 17/16 |
| | | | | 73/152.49 |
| 8,255,164 | B2 | 8/2012 | Home | |
| 8,294,458 | B2* | 10/2012 | Huggett | G01H 1/003 |
| | | | | 324/220 |
| 9,581,706 | B2* | 2/2017 | Huang | G01V 1/184 |
| 2007/0153628 | A1 | 7/2007 | Mathiszik et al. | |
| 2009/0092003 | A1 | 4/2009 | Goujon et al. | |
| 2011/0254552 | A1* | 10/2011 | Wu | G01V 3/28 |
| | | | | 324/339 |
| 2012/0314537 | A1* | 12/2012 | Kamata | G01V 1/164 |
| | | | | 367/25 |
| 2013/0343158 | A1 | 12/2013 | Kragh et al. | |
| 2015/0300161 | A1* | 10/2015 | Kamata | E21B 47/01 |
| | | | | 166/250.01 |

OTHER PUBLICATIONS

A.A. Kolyshkin, Remi Vaillancourt, "Analytical Solutions to Eddy-Current, testing problems for a layered medium with varying properties", IEEE Transations on Magnetics, vol. 33, No. 4, Jul. 1997, pp. 2473-2477.

International Search Report and Written Opinion issued in the Related PCT Application PCT/US2016/013505, dated Apr. 26, 2017 (13 pages).

* cited by examiner

F I G . 6
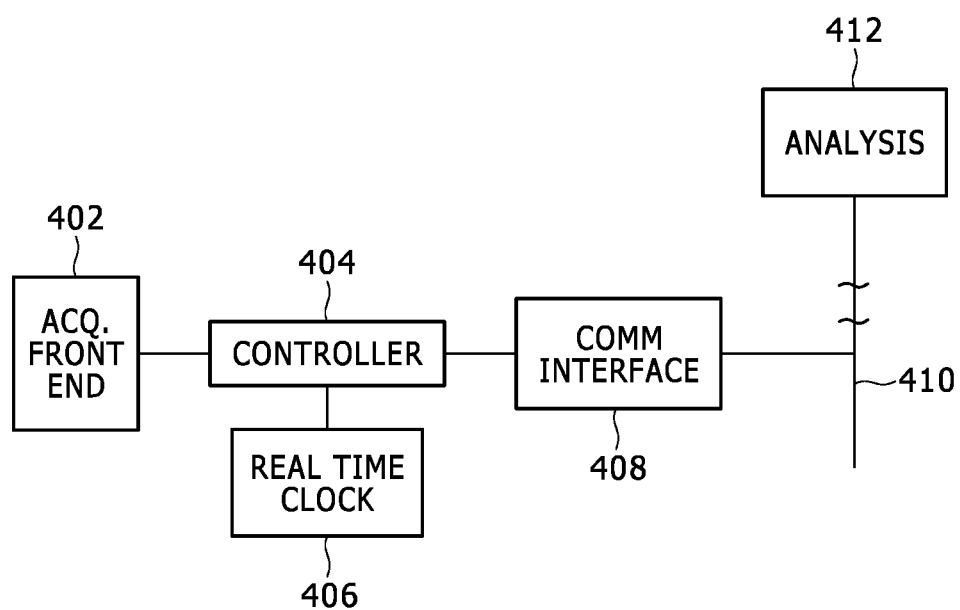

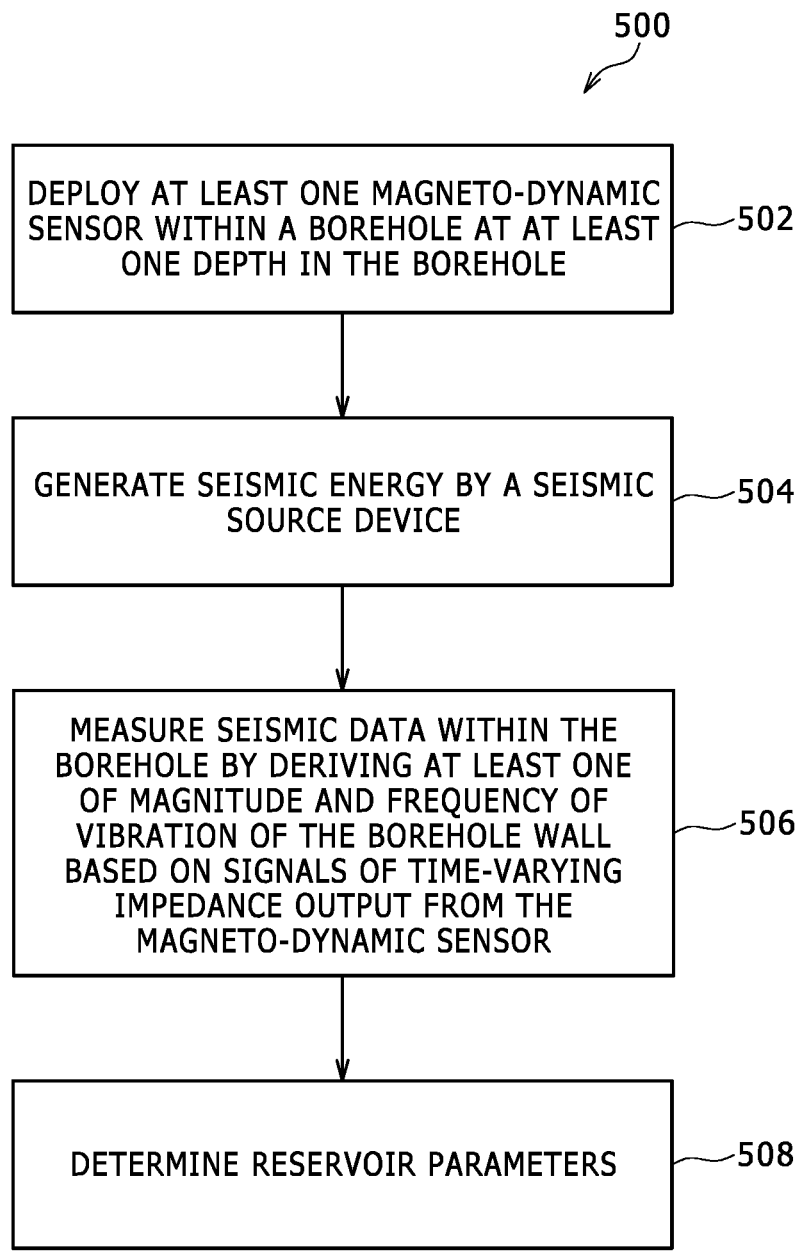

METHODS AND SYSTEMS FOR NON-CONTACT VIBRATION MEASUREMENTS

CROSS-REFERENCE TO RELATED APPLICATIONS

This application is based upon and claims the benefit of the priority of U.S. Provisional Application Ser. No. 62/103,974 entitled "NON-CONTACT MAGNETO-DYNAMIC VIBRATION SENSOR SYSTEM AND METHOD" filed on Jan. 15, 2015, the disclosure of which is incorporated herein in its entirety by reference thereto.

BACKGROUND

The following descriptions and examples are not admitted to be prior art by virtue of their inclusion in this section. This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to methods and systems for non-contact measurements of acoustic signals via a borehole wall. In particular, the present disclosure relates to non-contact measurements of acoustic signals during seismic activities in oilfields or gasfields.

Downhole acoustic investigation has been used in studying the structure of an underground formation on the basis of acoustic waves measured at various locations in a borehole, as well as studying seismic activities due to natural or controlled events. Seismic sensor (receiver) arrays are installed in a borehole in order to benefit from low acoustic noise. VSP (Vertical Seismic Profiling), Cross-well or Single-well techniques may be employed in the art of seismic surveys.

These techniques use arrays of sensors arranged within the borehole. The latest technologies comprise shuttles equipped with geophones or accelerometers coupled to the formation and in some cases decoupled from a tool body in order to provide a good quality measurement. Although decoupling the sensor from the tool body may prevent the propagation of undesirable noise, coupling of the sensor to the formation is often hindered by the size of the sensor packaging and the compliance of the formation itself. These limitations prevent the acquiring of signals exempt from spurious modes and thus may limit the frequency bandwidth of the acquired signal.

Many of the above-described techniques require the coupling of the sensor body to the formation and in some cases, complex tool architecture is designed in order to achieve this condition. As a result, the deployment of such tools may require to anchor the tool against the formation for each depth investigated. While the tool is stationary the signal is acquired. For the next measurement depth, the anchoring is released, the tool moves up to the next stage and is re-anchored so as to be in contact within the formation, and so on.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method of measuring acoustic signals via a borehole wall is provided. The method comprises deploying a non-contacting magneto-dynamic sensor at at least one depth in a borehole. The magneto-dynamic sensor comprises a coil excited by an electric current and a circuitry for outputting a signal corresponding to a time-varying impedance of the coil. The method further comprises deriving at least one of magnitude and frequency of vibration of the borehole wall based on the signal corresponding to the time-varying impedance.

In another aspect of the present disclosure, a system of measuring acoustic signals via a borehole wall is provided. The system comprises one or more non-contact magneto-dynamic sensors configured or designed for deployment at at least one depth in a borehole. The magneto-dynamic sensor comprises a coil excited by an electric current and a circuitry for outputting a signal corresponding to a time-varying impedance of the coil. The system further comprises a processor configured to perform signal processing for deriving at least one of magnitude or a frequency of vibration of the borehole wall based on the signal corresponding to the time-varying impedance.

In some embodiments, the current supplied to the coil may include a DC current. The frequency of vibration may be derived based on an imaginary part of a sinusoidal component of the time-varying impedance. The magnitude of vibration may be derived based on a real part of a sinusoidal component of the time-varying impedance, using at least one geometric parameter and at least one electromagnetic parameter in the space in which the magnetic field is formed. The at least one geometric parameter may include at least one of a radius of the coil or a distance between a center of the coil and the borehole wall. The at least one electromagnetic parameter may include electrical conductivity of the borehole wall. The coil may be a solenoid.

In yet another aspect of the present disclosure, the vibration of the borehole wall may be generated by a seismic activity due to a natural or controlled event. The system may further comprise a tool configured or designed for deployment at at least one depth in a borehole, and a communications interface operably connected to the processor. The tool may comprise the one or more non-contact magneto-dynamic sensors.

In certain embodiments herein, the system may further comprise one or more sources configured or designed for generating a seismic wavefield. The system may be configured for Vertical Seismic Profile (VSP) data acquisition, crosswell data acquisition, or single well data acquisition.

Advantages and novel features of the disclosures will be set forth in the description which follows or may be learned by those skilled in the art through reading the materials herein or practicing the principles described herein. Some of the advantages described herein may be achieved through the elements recited in the attached claims.

BRIEF DESCRIPTION OF THE DRAWINGS

The accompanying drawings illustrate certain embodiments and are a part of the specification. Embodiments of methods and systems of measuring acoustic signals via a borehole wall according to the disclosures herein are described with reference to the following figures. Together with the following description, the drawings also demonstrate and explain some of the principles of the present disclosure. In the figures, the same numbers are used throughout the figures to reference like features and components.

FIG. 6 is a block diagram representation of the configuration of one possible seismic acquisition system with a magneto-dynamic sensor in accordance with embodiments of the present disclosure;

FIG. 7 is a flowchart depicting steps of one possible seismic acquisition method including non-contact vibration measurements using a magneto-dynamic sensor in accordance with embodiments of the present disclosure.

DETAILED DESCRIPTION

Figure 1:
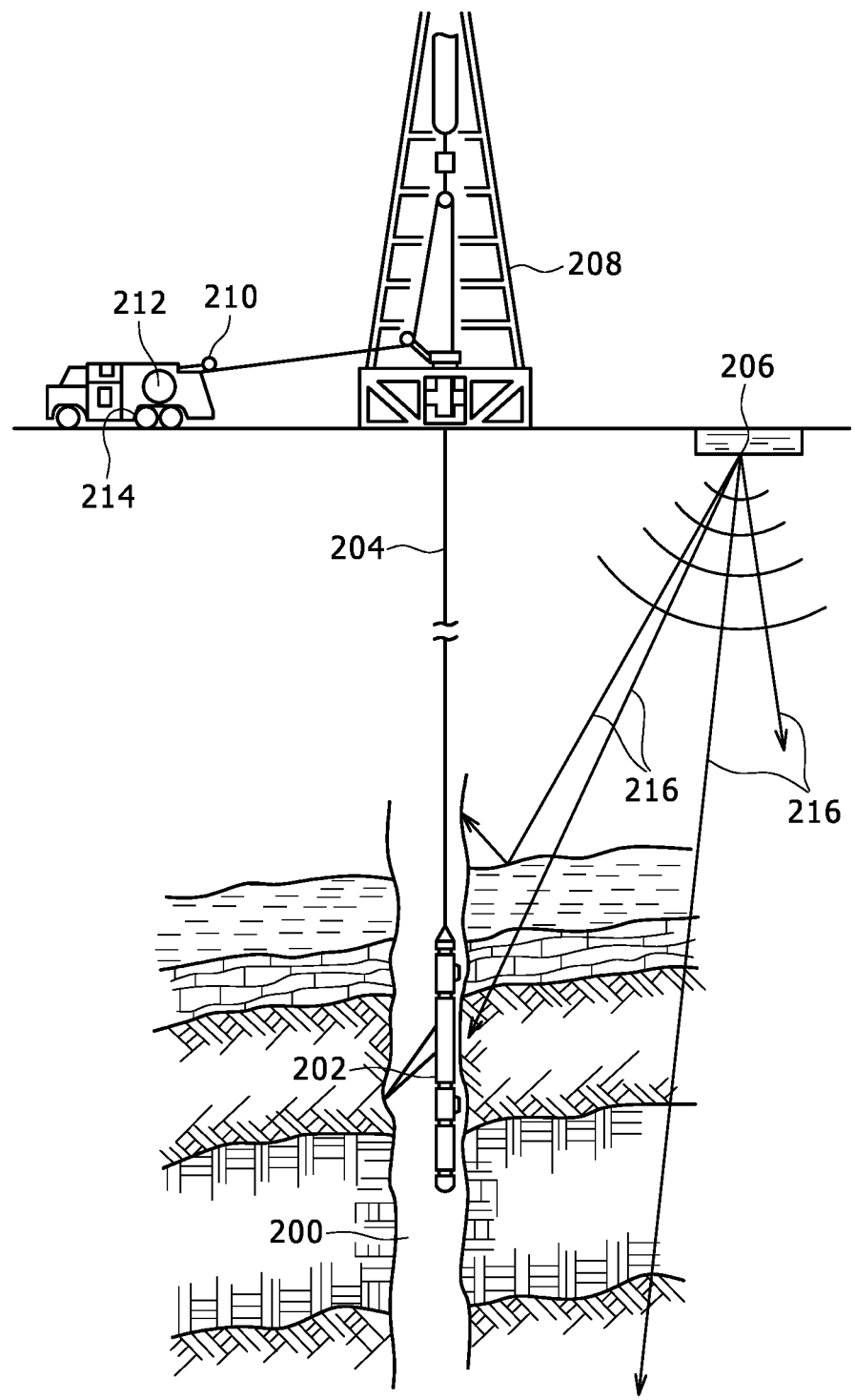
FIG. 1 depicts a schematic view, partially in cross-section, of a wellsite with a downhole seismic tool deployed into a wellbore implemented in accordance with embodiments of the present disclosure.

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

As used throughout the specification and claims, the term "downhole" refers to a subterranean environment, particularly in a wellbore. "Downhole tool" is used broadly to mean any tool used in a subterranean environment including, but not limited to, a logging tool, an imaging tool, an acoustic tool, a permanent monitoring tool, and a combination tool.

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present disclosure.

Moreover, inventive aspects lie in less than all features of a single disclosed embodiment. Thus, the claims following the Detailed Description are hereby expressly incorporated into this Detailed Description, with each claim standing on its own as a separate embodiment.

Embodiments of the present disclosure may be used to measure borehole vibration with the method without being in contact with the formation. Some general advantages of exemplary embodiments of such method are faster seismic survey, there are no need to clamp devices against the borehole to ensure a good coupling with the formation. In addition, in some embodiments tools architecture is simpler, there is no need to use clamping devices. While in other embodiments, the measurement may be done in logging mode, logging while moving up or down, the tool does not have to be stationary. In other embodiments, the applications in the oil field business are numerous, for example, such as a better quality of measurement of the borehole velocity field in a logging while drilling application.

Referring to FIG. 1, it is desirable to use seismic information to develop maps or images of underground features using a seismic source 206 generating seismic wavefield 216. In this, the source of seismic energy may be a controlled seismic source or a passive seismic source. Seismic energy propagating through subterranean formations is used to determine the geological characteristics of the underground strata in the region surrounding the well 200, into which a seismic sensor package or sonde 202 is placed. The source 206 can be any of a plurality of controlled source types including, but not limited to, a vibrator, an airgun, or any other type of source that is known to persons of skill in the art for the purposes described herein. Receiver instruments or sensors of the sonde 202 detect these seismic waves after they have traveled through the underground strata. After processing, the measured waves can be used to determine the characteristics of the boundaries, interiors, and surfaces in the strata through which they have traveled.

Borehole seismic measurements typically use three-component (3C) sensors which measure translational movements of the earth in three orthogonal directions, as described in U.S. application Ser. No. 12/428,451 filed on Apr. 22, 2009, the entire contents of which are hereby incorporated by reference herein. These measurements use several sets of three-component geophones forming an array arranged at different depths in the borehole. The resulting survey is typically referred to as a Vertical Seismic Profile (VSP). From these borehole seismic measurements, it is possible to derive various elastic properties, i.e., parameters, of the subsurface which can be used in, for example, exploration and development of hydrocarbon reservoirs, CO2 sequestration, water reservoir monitoring, among other applications that are known to those skilled in the art. One set of properties that can be measured is that of elastic anisotropy which describes the directional variation of the seismic wave properties. Such measurements are important since if these variations are neglected during data processing they can cause sub-optimal results.

Referring also to FIG. 1, a signal 216 propagates throughout the formation to sensors 202. The time of generation of the seismic signal 216 is measured as well as a time of receipt of the signal at receiver(s) 202. As used herein, the terms "receiver" and "sensor" include any suitable device that is configured for detection of source signals and associated noise for the purposes described herein.

The present disclosure contemplates application of the principles herein to various areas, such as wireline, seismic-while-drilling, permanent monitoring, hydro-fracture monitoring, production logging, among others. The systems and methods disclosed may be utilized for active or passive seismic monitoring in connection with oil and gas exploration and development, CO2 sequestration, water reservoirs, and microearthquakes. In this, the receiver equipment disclosed herein may be deployed in boreholes on land or in the sea.

In FIG. 1, borehole 200 may be a previously drilled well, such as a production well or a monitoring well, with the sensor shuttle 202 that is used to acquire translational and rotational components of a seismic wavefield 216. Although one shuttle is depicted in FIG. 1, a series of shuttles may be provided as desirable or necessary. The source 206 may be any type of suitable instrumentation for generating the desired controlled signals, or the source of the seismic signals may be passively produced micro earthquakes induced by fracturing propagating through the underground strata. The seismic signals 216 propagate through the formation, and some signals reach the sensor shuttle 202 having one or more receiving devices for detecting the seismic signals. The sensor arrangement 202 and the associated receiving devices may be used as the primary apparatus for collecting the seismic measurements, as described in greater detail below. One or more clocks are used to measure the exact time that the signals 216 are generated and when the signals are detected at the one or more receiving device.

In one embodiment, a suitable cable 204, for example, a wireline, slickline, or other conveyance that is configured for data telemetry, is provided for communication uphole with a controller and/or analysis module 214 on the surface of the borehole. The controller and/or analysis module 214 may be a stand alone, or may be integrated into a field vehicle as shown in one example of FIG. 1. According to the principles described herein, the shuttle section(s) may be moved through the borehole 200 by winch 210, via a suitable arrangement in the drilling tower 208. A device 212 may be used to record the depth of the section 202. In one embodiment, the section 202 may be lowered to a predetermined depth in the borehole 200. Then the winch 210 may pull the conveyance 204, and thus the section 202, up through the borehole 200.

The present disclosure relates to methods and systems for using a non-contacting magneto-dynamic sensor to measure velocity vectors of the bore wall, which are applicable to the above-described seismic data acquisition. As described below, the principle of the sensor is based on the Lorentz force. The induced magneto-static field by the sensor in a borehole varies according to a velocity vector of the borehole wall, which creates an induced current in the formation around the borehole. This induced magneto-static field changes the electrical impedance of a coil, such as a solenoid in the sensor, according to the frequency content and magnitude of the vector velocity of the formation. By measuring the impedance, acoustic signals generated by a seismic activity due to a natural or controlled event may be measured through the borehole wall instead of requiring a mechanical coupling of the sensor to the borehole.

Figure 2:
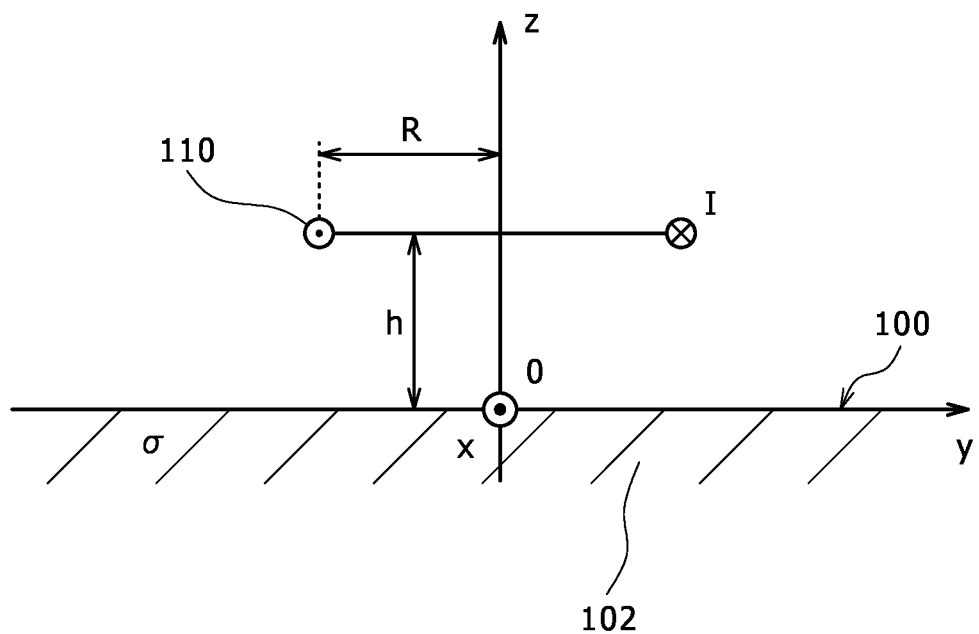
FIG. 2 illustrates schematically a model of a magneto-dynamic sensor for describing a principle of non-contact vibration measurement in accordance with embodiments of the present disclosure.
Figure 3:
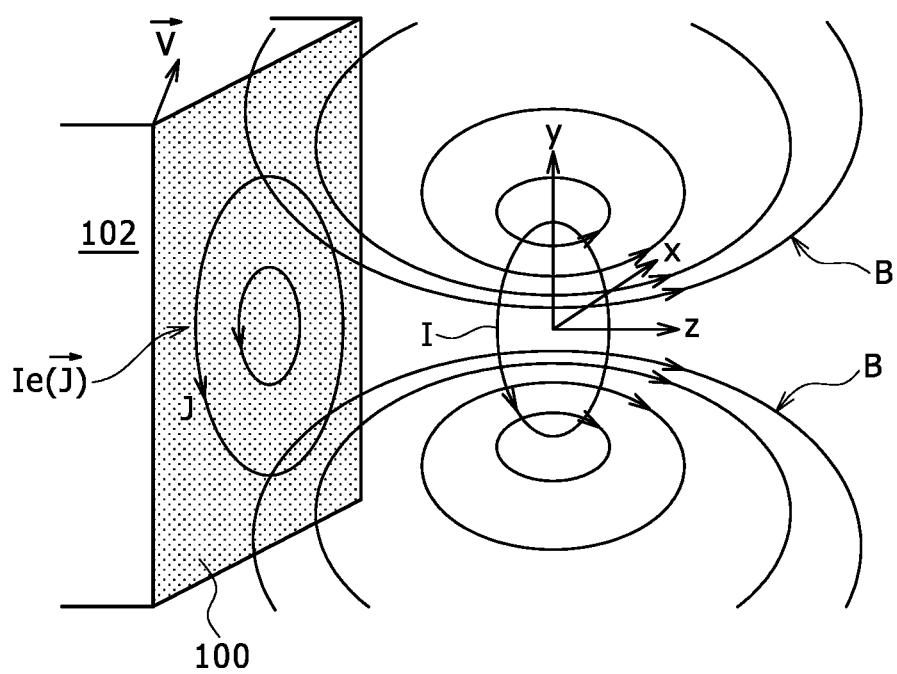
FIG. 3 is a perspective view showing a schematic model of a magneto-dynamic sensor in accordance with embodiments of the present disclosure.

FIG. 2 generally illustrates schematically a model of a magneto-dynamic sensor and will be used for describing a principle of non-contact vibration measurements. In addition, FIG. 3 is a perspective view generally representative of a schematic model of the magneto-dynamic sensor. The model in FIGS. 2 and 3 will be referenced in part to describe the principles of measurements of a vector velocity V (see FIG. 3) of the borehole wall 100 (see FIG. 2). The sensor in this example is oriented so as to measure the vector velocity V of the borehole wall 100 in the radial direction denoted as z in the model.

Some embodiments of the method in the present disclosure measure an electrical impedance of a coil 110, such as a solenoid for example, excited by a known electrical input current I. The measured variation of the impedance of coil 110 is due to at least in part to the change of the magnetic field flux B. The electrical impedance can be broken down into three main components that can be written as:

$$Z_b = Z_0 + Z_\sigma Z_V. \tag{1}$$

In the general case (referring to FIG. 3), the input current I of the coil 110 is non-stationary; it creates a time varying magnetic field B which induces an eddy current Ie on the borehole wall 100 or in the formation 102 as a conductor. The eddy current Ie creates a magnetic field that opposes the magnetic field B that created it.

By adding a motion of the borehole wall 100 as a conductor in the magnetic field B, the electrical charges on the conductor 100 move along with it and obey the Lorentz force. These moving charges create an eddy current Ie circulating on the borehole wall 100 or in the formation. The eddy current Ie creates a magnetic field changing the impedance of the coil 110.

In Equation (1), $Z_0$ is the impedance related to the input current I, which is simply the impedance of its self-inductance, $Z_\sigma$ is the impedance induced by the eddy current Ie in the conductor (borehole wall 100 or formation 102). The impedance induced by the eddy current Ie is much smaller than the impedance related to the input current I. Accordingly, $Z_\sigma \ll Z_0$. $Z_V$ is the impedance due to the current generated by the moving conductor (borehole wall 100 or formation 102).

The current circulating in conductive medium (borehole wall 100 or formation 102) are given by ohm's equation:

$$\vec{J} = \sigma \vec{Em}, \tag{2}$$

where $$\vec{Em} = \vec{E} + \vec{V} \times \vec{B}, \tag{3}$$

J is the current density, Em is the voltage of electromotive force generated in the medium, σ is electrical conductivity of the medium and "×" is the vector cross product.

Numerical application shows the following relationship written as:

$$Z_0 \gg Z_\sigma \gg Zv. \quad (4)$$

le;.5qConsidering the low magnitude of the impedance Zv compared to the impedances $Z_0$ and $Z_\sigma$, embodiments of the method in the present disclosure access the vector velocity V by supplying a DC input current to the coil 110 in order to vanish the amplitude of the self-impedance of the coil 110. The problem can then be reduced to a magneto-static case, when the velocity of the conductor such as the borehole wall 100 or formation 102 is zero. The terminology used in the present disclosures herein is "magneto-dynamic", in which "dynamic" refers to the motion of the conductor.

Embodiments of this method in the present disclosure may be able to access only the impedance Zv and not be contaminated by the effect of the un-stationary input of the solenoid, as described in Equation (4).

In following discussion, an analytical solution is described to derive the vector velocity V of a moving conductor placed in front of the sensor. Because of the symmetry, the analytical solution is only derived using motion collinear with the coil axis along the z direction as shown in FIGS. 2 and 3. The other components of the vector velocity V may be derived with a semi-analytical solution or a numerical approach.

<Description of an Exemplary Problem to Solve>

The response of the magneto-dynamic sensor can be predicted with the following analytical model. In the model, the assumptions of the problem are as follows:

The input current I of the coil 110 is stationary, which is not dependent upon time.

The velocity of the moving conductor (borehole wall 100 or formation 102) is seen from the sensor as uniform.

The amplitudes of the vibrations of the moving conductor are very low compared to the distance h between the borehole wall 100 and the center of the coil 110, which is referenced in FIG. 2.

In order to simplify the equation and derive a simple solution, the motion of the conductor is considered harmonic and is described by:

$$\vec{V}(t) = V_0 e^{i\omega t} \vec{U}_z. \quad (5)$$

This assumption does not constraint the analytical solution to this particular harmonic input. The full waveform can be reconstructed with an inverse Fourier transform.

<Maxwell Equation in the Medium>

If the medium is assumed to be insulated with a permeability $\mu = \mu 0$, then the local Maxwell equations can be written as:

$$div(\vec{E}) = \frac{\rho}{\varepsilon_0}, \quad (6)$$

$$div(\vec{B}) = 0, \quad (7)$$

$$\overrightarrow{rot}(\vec{E}) = -\frac{\partial \vec{B}}{\partial t}, \quad (8)$$

$$\overrightarrow{rot}(\vec{B}) = \varepsilon_0 \mu_0 \frac{\partial \vec{E}}{\partial t} + \mu_0 \vec{J}. \quad (9)$$

Including the magnetic Potential $\vec{A}$ as defined by:

$$\overrightarrow{rot}(\vec{A}) = \vec{B}, \quad (10)$$

the following wave equation (11) is obtained from the Maxwell equations (6) to (10).

$$\Delta \vec{A} - \frac{1}{c^2} \frac{\partial^2 \vec{A}}{\partial t^2} = -\mu_0 \vec{J} \quad (11)$$

In the frequency range of sonic signals lower than 20 kHz, the non-stationary term can be neglected and the Maxwell equations can be reduced to the following equations:

$$\Delta \vec{A} = -\mu_0 \vec{J}, \quad (12)$$

$$\overrightarrow{rot}(\vec{A}) = \vec{B}, \quad (13)$$

$$\vec{E} = -\frac{\partial \vec{A}}{\partial t}. \quad (14)$$

Because of the cylindrical symmetry, the magnetic potential is equal to:

$$\vec{A} = A(r,z,t)\vec{U}_\theta. \quad (15)$$

For the upper space (z>0), the relation between the current density J and the magnetic potential in the loop of coil 110 can be written as:

$$\vec{J}(z>0) = NI\delta(r-R)\delta(z-h)A(r,z,t)\vec{U}_\theta, \quad (16)$$

where N is the number of turns of the coil 110, R is the radius of the coil 110, h is the distance between the center of the coil and the moving conductor (borehole wall 100).

On the other hand, for the lower space (z<0), Ohm's law in the moving conductor can be written as:

$$\vec{J}(z<0) = \sigma(\vec{E} + \vec{V} \times \vec{B}). \quad (17)$$

Replacing the magnetic field B and the electrical field E by its potential A yields the following expression:

$$\vec{J}(z<0) = -\sigma\left(\frac{\partial \vec{A}}{\partial t} + \frac{\partial A}{\partial z} V \vec{U}_\theta\right). \quad (18)$$

Equation (12) becomes:

$$\Delta \vec{A} = -\mu_0 NI\delta(r-R)\delta(z-h)A(r,z,t)\vec{U}_\theta (z>0), \quad (19)$$

$$\Delta \vec{A} = -\mu_0 \sigma\left(\frac{\partial \vec{A}}{\partial t} + \frac{\partial A}{\partial z} V \vec{U}_\theta\right)(z<0). \quad (20)$$

<Resolution of the Wave Propagation of the Maxwell Equation>

By projecting Equations (19) and (20) on the vector, the previous vector equations become scalar, and by separating the magnetic potential A(r,z) in two in the half space (z>0) and in the half space (z<0), Equations (19) and (20) becomes:

$$\Delta_\theta A_0(r, z, t) = -\mu_0 NI\delta(r-R)\delta(z-h), \quad (21)$$

-continued $$\Delta_\theta A_1(r,z,t) = \mu_0 \sigma \left( \frac{\partial A_1}{\partial t} + V_0 e^{i\omega t} \frac{\partial A_1}{\partial t} \right), \quad (22)$$

where the equation of continuity can be written as:

$$A_0(r,0) = A_1(r,0), \quad (23)$$

$$\frac{\partial A_0(r,0)}{\partial z} = \frac{\partial A_1(r,0)}{\partial z}. \quad (24)$$

When the limit of z tends towards infinity, the vector potential tends necessarily towards zero, then $$A_0(r,0) \xrightarrow[z \to \infty]{} 0, \quad (25)$$

$$A_1(r,0) \xrightarrow[z \to \infty]{} 0. \quad (26)$$

There are several methods to solve these six equations (21)-(26). In some embodiments of the present disclosure herein, the Hankel transform is used, which has the advantage to transform the Laplacian, expressed in cylindrical coordinate, into a much simpler form.

<Hankel Transform of the Wave Propagation>

For the Hankel transform, $J_1$ the function of the first order and the Hankel transform of the function $A_i$ can be defined as follows:

$$J_1(x) = \int_0^\infty \cos(t - \sin t) dt, \quad (27)$$

$$\tilde{A}_i(\lambda) = \int_0^\infty A_i(r,z) r J_1(\lambda r) dr. \quad (28)$$

By using the defined functions, the transformation of $\Delta_\theta A_i$ becomes $$\frac{\partial^2 \tilde{A}_i}{\partial z^2} - \lambda^2 \tilde{A}_i$$

and by using the transformation of:

$$\int_0^\infty \delta(r-R)\delta(z-h) J_1(\lambda r) r dr = R \delta(z-h) J_1(\lambda R), \quad (29)$$

the foregoing equations (21) and (22) can be written as:

$$\frac{\partial^2 \tilde{A}_0}{\partial z^2} - \lambda^2 \tilde{A}_0 = -\mu_0 N I_o R \delta(z-h) J_1(\lambda R), \quad (30)$$

$$\frac{\partial^2 \tilde{A}_1}{\partial z^2} - \lambda^2 \tilde{A}_1 = \mu_0 \sigma \left( \frac{\partial \tilde{A}_1}{\partial t} + V_0 e^{i\omega t} \frac{\partial \tilde{A}_1}{\partial t} \right). \quad (31)$$

By applying the same transformations to the boundary conditions, the foregoing equations (23) and (24) can be written as:

$$\tilde{A}_0(r,0) = \tilde{A}_1(r,0), \quad (32)$$

$$\frac{\partial \tilde{A}_0(r,0)}{\partial z} = \frac{\partial \tilde{A}_1(r,0)}{\partial z}. \quad (33)$$

<Resolution of the Wave Propagation in the Hankel Space>

$A_1$ is the solution of the following differential equation:

$$\frac{\partial^2 y}{\partial z^2} - \lambda^2 y = \mu_0 \sigma \left( \frac{\partial y}{\partial t} + V_0 e^{i\omega t} \frac{\partial y}{\partial z} \right), \quad (34)$$

where the term $\lambda$ is referred to a fixed number and $\omega(=2\pi f)$ is an angular frequency.

The term $$e^{i\omega t} \frac{\partial y}{\partial z}$$

in Equation (34) couples the variable z and t, and prohibits using the variable separation method to solve this differential equation. Thus, it may be necessary to look for solutions for Equation (34) that satisfy the boundary conditions. Obvious solutions which do not tend towards zero at infinity are not solutions, like for example:

$$S_{d1} = S_{d0}(t) \left( z + \frac{iV_0}{\sigma \mu_0 \omega} e^{i\omega t} \right), \quad (35)$$

and it may be checked that the following expression (36) is a solution of the problem.

$$S_\alpha = e^{q_\alpha z} e^{i\alpha \omega t + i \frac{V_0 q_\alpha}{\omega} e^{i\omega t}} \quad \alpha \in \mathbb{C}, \quad (36)$$

if $$q_\alpha^2 = \lambda^2 + i\alpha \mu_0 \sigma \omega. \quad (37)$$

<Restriction on the $\alpha$ Coefficient>

For the solution of Equation (36), it may be enough to consider the steady state and because $\alpha \in \mathbb{C}$ provides two types of solutions, divergent solutions can be eliminated by considering the following constraints A, B and C:

(Constraint A)—$\alpha$ has to be a real number in order to avoid the divergence of $e^{i\alpha \omega t}$, and (Constraint B)—because the excitation has a period of $$\frac{2\pi}{\omega},$$

the term $e^{i\alpha \omega t}$ has a period in $$\frac{2\pi}{\alpha \omega}$$

if and only if $\alpha$ is an integer $\alpha \in \mathbb{Z}$.

Then, Equation (36) can be written as:

$$S_\alpha = e^{\Re_e(q_\alpha) z} e^{i\alpha \omega \left( t + \frac{\Im_m(q_\alpha) z}{\omega} \right)} e^{i \frac{V_0 q_\alpha}{\omega} e^{i\omega t}}. \quad (38)$$

The first term in Equation (38) represents the spatial damping while the second term in the exponential is related to the wave propagation following the z.

The last constraint C shows that: $\Re(q_\alpha)$ and $\Im(q_\alpha)$ have to be greater than zero and imposes $\alpha \in N$, indeed these two conditions are necessary to obtain convergent solutions.

Then, the potential $\tilde{A}_1$ is a linear combination of the family of the physically acceptable solutions as:

$$\left\{ e^{q_\alpha z} e^{i\alpha\omega t + i\frac{V_0 q_\alpha}{\omega} e^{i\omega t}} | q_\alpha = \sqrt{\lambda^2 + i\alpha\mu_0\sigma\omega} \right\}_{\alpha \in N} = \{S_\alpha\}_{\alpha \in N}. \quad (39)$$

The expression $q_\alpha$ contains the skin effect factor written as:

$$q_\alpha = \sqrt{\lambda^2 + i\frac{1}{\delta_\alpha^2}}, \quad (40)$$

with the equation:

$$\delta_\alpha = \frac{1}{\sqrt{\alpha\mu_0\sigma\omega}}, \quad (41)$$

which is the classical form to represent the skin effect factor.

<Resolution of $\tilde{A}_0$>

Figure 4:
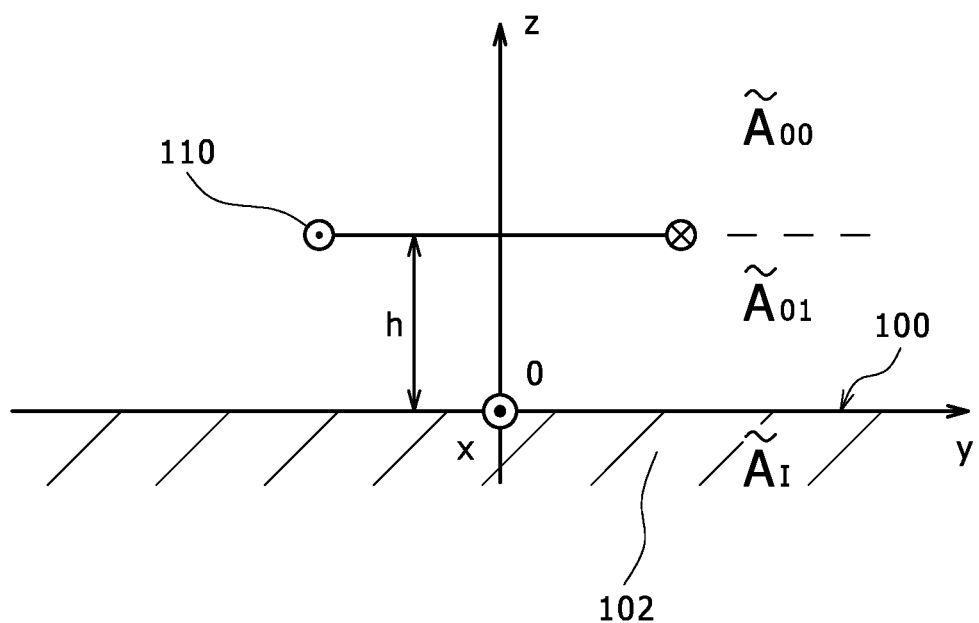
FIG. 4 shows another schematic model of a magneto-dynamic sensor for describing a principle of non-contact vibration measurement in accordance with embodiments of the present disclosure.

Referring generally to FIG. 4, this figure is a schematic model of a magneto-dynamic sensor and is used for describing a principle of non-contact vibration measurements showing magnetic potentials in the Hankel space. In order to solve Equation (30), the potential $\tilde{A}_0$ is decomposed in $\tilde{A}_{00}$ in the half space (z>h) and $\tilde{A}_{01}$ for (0<z<h).

Equation of continuity yields to:

$$\tilde{A}_{00}(\lambda,h) = \tilde{A}_{01}(\lambda,h), \quad (42)$$

and using this result, the Integral of Equation (30) can be written as:

$$\frac{\delta \tilde{A}_{00}}{\delta z}(\lambda, h^+) - \frac{\delta \tilde{A}_{01}}{\delta z}(\lambda, h^-) = -\mu_0 N I_o R J_1(\lambda R) \quad (43)$$

The homogenous solution of Equation (43) is obtained as:

$$\tilde{A}_{00}(\lambda,h) = C_0 e^{-\lambda z} \quad (44)$$

$$\tilde{A}_{01}(\lambda,h) = C_1^- e^{-\lambda z} + C_1^+ e^{\lambda z} \quad (45)$$

It is noted that the solution $\tilde{A}_{00}$ of Equation (44) only has one term because the second one is divergent. The resolution of the coefficient $C_0$, $C_1^-$ and $C_1^+$ is done by writing the conditions of continuity with Equations (42), (43), (44) and (45).

Under a matrix form:

$$\begin{pmatrix} e^{-\lambda h} & e^{-\lambda h} & e^{-\lambda h} \\ \lambda e^{-\lambda h} & \lambda e^{-\lambda h} & \lambda e^{-\lambda h} \\ 0 & 1 & 1 \end{pmatrix} \begin{pmatrix} C_0 \\ C_1^- \\ C_1^+ \end{pmatrix} = \begin{pmatrix} 0 \\ -\mu_0 N I_o R J_1(\lambda R) \\ \tilde{A}_1(z=0) \end{pmatrix}, \quad (46)$$

the inverse of the matrix allows fully determining the coefficients:

$$C_1^+ = \frac{\mu_0 N I_o R J_1(\lambda R)}{2\lambda} e^{-\lambda h}, \quad (47)$$

$$C_1^- = \tilde{A}_1(z=0) - C_1^+, \quad (48)$$

$$C_0 = C_1^- - e^{2\lambda h} C_1^+. \quad (49)$$

In writing the equations of continuity at z=0, Equations (32) and (33) can be written in a matrix form as:

$$\begin{pmatrix} 1 & 1 \\ \lambda & \lambda \end{pmatrix} \begin{pmatrix} C_1^- \\ C_1^+ \end{pmatrix} = \begin{pmatrix} \tilde{A}_1(z=0) \\ \frac{\delta \tilde{A}_1}{\delta z}(z=0) \end{pmatrix}, \quad (50)$$

and this gives:

$$\frac{\delta \tilde{A}_1}{\delta z}(z=0) + \lambda \tilde{A}_1(z=0) = 2\lambda C_1^+. \quad (51)$$

<Resolution of $\tilde{A}_1$ Using the Linear Combination Described in Equation (39)>

The transformed magnetic potential $\tilde{A}_1 \in \{S_\alpha\}_{\alpha \in N}$ in Equation (39) can be written as:

$$\tilde{A}_1 = \Sigma_{n=0}^{\infty} D_n S_n. \quad (52)$$

This equation (52) is valid for all t and z, however the coefficient D is a function of $\lambda$. By replacing this linear combination of Equation (52) into the foregoing Equation (51), the following equation (53) can be obtained.

$$\Sigma_{n=0}^{\infty} D_n (q_n + \lambda) S_n(z=0) = 2\lambda C_1^+ \quad (53)$$

It is noted that each $$S_n(z=0) = \sum_{n=0}^{\infty} \left( i\frac{V_o q_n}{\omega} \right)^k \frac{1}{k!} e^{i(k+n)\omega t}, \quad (54)$$

can be written as:

$$S_n(z=0) = e^{in\omega t} e^{i\frac{V_0 q_n}{\omega} e^{i\omega t}}$$

by using the series expansion of $$e^z = \sum_{n=0}^{\infty} \frac{z^k}{k!}.$$

The coefficient is redefined as:

$$\frac{\lambda + q_n}{2\lambda C_1^+} D_n = \frac{\left(-i\frac{V_o q_n}{\omega}\right)^n}{n!} H_n, \quad (55)$$

and by using the series expansion of the $e^z$ and the redefined coefficient of Equation (55), Equation (53) of $\Sigma_{n=0}^{\infty} D_n (q_n + \lambda) S_n(z=0) = 2\lambda C_1^+$ can be written as a double summation:

$$\sum_{n=0}^{\infty} \sum_{k=0}^{\infty} H_n \left( i \frac{V_o q_n}{\omega} \right)^{n+k} \frac{(-1)^n}{n!k!} e^{i(k+n)\omega t} = 1. \quad (56)$$

Because Equation (56) is valid for all t, with h=k+n; it is capable of identifying all the coefficients in front of the $e^{ih\omega t}$ as:

$$\sum_{n+k=h} H_n \left( i \frac{V_o q_n}{\omega} \right)^{n+k} \frac{(-i)^n}{n!k!} = \delta_{h,0}, \quad (57)$$

where the $\delta_{h,0}$ is the Dirac coefficient.

Since Equation (57) is valid for all h∈ℕ, in order to simply the expression, each side of Equation (57) can be multiplied by $$h! \left( i \frac{V_o}{\omega} \right)^{-h}.$$

This gives the following Equation (58) which provides a recurrence relation $H_n$ with $H_0=1$.

$$\sum_{n=0}^{h} H_n (-1)^n q_n^h \frac{h!}{n!(h-n)!} = \sum_{n=0}^{h} H_n (-1)^n q_n^h \binom{h}{n} = \delta_{h,0} \quad (58)$$

<Solution of the Potential in z<0>

Equation (58) allows the computation of $H_n(\lambda)$. By using this computed $H_n(\lambda)$ and combining Equation (52) with Equations (39) and (55), the solution of magnetic potential $\tilde{A}_1$ can be obtained as:

$$\tilde{A}_1(\lambda, z, t) = C_1^+ \sum_{n=0}^{\infty} H_n q_n^n \frac{2\lambda}{q_n + \lambda} \frac{\left( -i \frac{V_o}{\omega} e^{i\omega t} \right)^n}{n!} e^{q_n \left( z + i \frac{V_0}{\omega} e^{i\omega t} \right)}. \quad (59)$$

In order to verify the validity of Equation (59), the magnetic potential when angular frequency ω tends towards zero is calculated. By using the condition of $q_n = \sqrt{\lambda^2 + in\mu_0 \sigma \omega} \to \lambda$ and injecting this result in the recurrence relation $$H_n, \sum_{n=0}^{h} H_n (-1)^n \lambda^h \binom{h}{n} = \delta_{h,0},$$

then $\lambda^h$ can be simplified.

Furthermore, the analogy with the binomial theorem expressed by the following Equation (60) can be applied.

$$(x+y)^h = \sum_{n=0}^{h} x^{h-n} y^n \binom{h}{n} \quad (60)$$

By applying this theorem to $(1-1)^h$, it is equal to zero expected for h=0 as:

$$\sum_{n=0}^{h} 1^{h-n} (-1)^n \binom{h}{n} = \delta_{h,0}. \quad (61)$$

In the analytical model of the present disclosures, by using the following relation of Equation (62), the foregoing Equation (58) can be verified for all h.

$$H_n(\omega=0)=1 \quad (62)$$

For this particular case, the magnetic potential $\tilde{A}_1$ can be obtained as:

$$\tilde{A}_1(\lambda, z, t) = C_1^+ \sum_{n=0}^{\infty} \frac{\left( -\lambda i \frac{V_o}{\omega} e^{i\omega t} \right)^n}{n!} e^{\lambda \left( z + i \frac{V_0}{\omega} e^{i\omega t} \right)}. \quad (63)$$

Then, the series expansion of the exponential can be identified as follows:

$$\sum_{n=0}^{\infty} \frac{\left( -\lambda i \frac{V_o}{\omega} e^{i\omega t} \right)^n}{n!} = e^{-\lambda i \frac{V_0}{\omega} e^{i\omega t}}. \quad (64)$$

Finally, the magnetic potential $\tilde{A}_1$ can be obtained as:

$$\tilde{A}_1(\sigma \to 0) = C_1^+ e^{\lambda z}. \quad (65)$$

It is noted that this result is in agreement for the magnetic field induced by the current loop I of the coil 110 and $\tilde{A}_1(\sigma \to 0)(z=0) = C_1^+$ as well. When there is no conductor in front of the current loop I, the magnetic potential is $C_1^+$ while the coefficient $C_1^-$ is due to the field created by the moving conductor such as the borehole wall 100.

<Computation of the Electrical Impedance>

The electrical impedance of the coil 110 is varying with the magnetic field induced by the eddy current Ie circulating into the moving conductor.

The electrical potential of the coil 110 is due to the electromotive force defined by:

$$e = -\frac{d\Phi}{dt} = \oint \vec{E} d\vec{l} = -\frac{d}{dt} \oint \vec{A} d\vec{l}. \quad (66)$$

In order to reach the magnetic potential radiated by the moving conductor in the time domain, the magnetic potential may be defined in the Hankel space and an inverse Hankel transform may be applied to get it back to the time domain.

As discussed above, the magnetic field due to the moving field in the space z>0 is equal to:

$$\tilde{A}_V = C_1^- e^{-\lambda z}, \quad (67)$$

with $$C_1^- = \frac{\delta \tilde{A}_1}{2\lambda \delta z}(z=0) - \frac{1}{2} \tilde{A}_1(z=0). \quad (68)$$

By replacing the expression of $\tilde{A}_1$ in Equation (68) by the foregoing Equation (59), the coefficient $C_1^-$ becomes:

$$C_1^- = C_1^+ \sum_{n=0}^{\infty} H_n R^n q_n^n \frac{q_n - \lambda}{q_n + \lambda} \frac{P^n}{n!} e^{-R q_n P}, \tag{69}$$

with $$P = \frac{V_o}{i\omega R} e^{i\omega t}. \tag{70}$$

The magnetic potential in the time domain can be obtained as:

$$A_V(r,z,t) = \int_0^\infty \tilde{A}_V(\lambda,z,t) \lambda J_1(\lambda r) d\lambda. \tag{71}$$

Moreover, by replacing the coefficient $C_1^-$ by the solution found in Equation (48) and by making the following variable change:

$$\lambda \to \lambda' = \lambda R \; q'_n = \sqrt{\lambda'^2 + i n \omega \sigma \mu_0 R^2} \; q_n R; h' = h/R \tag{72}$$

the magnetic potential in the time domain can be obtained as:

$$A_V(r,z,t) = -\frac{NI_0 \mu_0}{2} \tag{73}$$

$$\int_0^\infty J_1(\lambda') J_1\left(\lambda' \frac{r}{R}\right) e^{-\lambda'(h'+z/R)} \sum_{n=0}^{\infty} H_n R^n q_n^m \frac{q'_n - \lambda}{q'_n + \lambda} \frac{P^n}{n!} e^{-q'_n P} d\lambda'$$

It is noted that the damping of the function depends on h+z, which is the distance of the current loop 1 to the conductor then reflected at a position z, where the magnetic potential A is calculated. It appears also when σ→0 for all n $q_n \to \lambda$, every term of the sum is zero and consequently the potential is zero as well.

It is also obvious to notice if P=0, which means the velocity V is nil, the potential is zero. Equation (73) allows computing the electrical impedance of the coil 110 as expressed by:

$$Z = \frac{e}{I} = \frac{-1}{I_0} \frac{d 2\pi R N A_V(R, h, t)}{dt}. \tag{74}$$

By taking the differential of P defined as:

$$dP = \frac{V(t)}{R} dt, \tag{75}$$

and substituting dt in Equation (75), the impedance Z becomes:

$$Z = \frac{-2\pi N}{I_0} \frac{dA_V(R, h)}{dP} V(t). \tag{76}$$

And by replacing the potential $A_V$ by its expression, the impedance Z can be expressed as:

$$Z = \pi N^2 \mu_0 V(t) \frac{d}{dP} \int_0^\infty \sum_{n=0}^\infty H_n q_n^m \frac{q'_n - \lambda}{q'_n + \lambda} \frac{P^n}{n!} J_1(\lambda)^2 e^{-2\lambda h'} e^{-q'_n P} d\lambda. \tag{77}$$

<Simplification of the Electrical Impedance for Small P Value>

The electrical impedance Z can be simplified for small value of P $$\left(P = \frac{V_o}{i\omega R} e^{i\omega t}\right).$$

P is ratio of the integral of the velocity over the radius of the loop. For P<<1, by taking the Taylor expansion of Equation (77), the impedance Z becomes linear in P.

The first order of the impedance Z can be derived in P as expressed in the following equation:

$$Z = \pi N^2 \mu_0 V(t) \frac{d}{dP} \int_0^\infty H_1 q' \frac{q' - \lambda}{q' + \lambda} P J_1(\lambda)^2 e^{-2\lambda h'} e^{-q'_n P} d\lambda. \tag{78}$$

By substituting $H_1 q' = \lambda$ and the following equation:

$$\frac{q' - \lambda}{q' + \lambda} = \frac{i\left(\frac{R}{\delta}\right)^2}{\left(\sqrt{\lambda^2 + i\left(\frac{R}{\delta}\right)^2} + \lambda\right)^2} \tag{79}$$

with $$\delta = \frac{1}{\sqrt{\mu_0 \sigma \omega}},$$

the impedance Z becomes:

$$Z \simeq \pi N^2 \mu_0 V(t) \int_0^\infty \frac{i\left(\frac{R}{\delta}\right)^2}{\left(\sqrt{\lambda^2 + i\left(\frac{R}{\delta}\right)^2} + \lambda\right)^2} J_1(\lambda)^2 e^{-2\lambda h'} \lambda d\lambda. \tag{80}$$

By defining the complex F which is dimensionless in terms of the real $$\frac{R}{\delta} \text{ and } \frac{h}{R},$$

the impedance Z can be simplified as:

$$Z \simeq i\pi N^2 \mu_0 R^2 V(t) F, \tag{81}$$

where $$F = \int_0^\infty \frac{i\left(\frac{R}{\delta}\right)^2}{\left(\sqrt{\lambda^2 + i\left(\frac{R}{\delta}\right)^2} + \lambda\right)^2} J_1(\lambda)^2 e^{-2\lambda h'} \lambda d\lambda. \tag{82}$$

The impedance Z, depending on the velocity $V(t) = V_o e^{i\omega t}$, vibrates at $\omega(=2\pi f)$, which is the vibration of the borehole wall 100. The excitation of the coil 110 is the vibration of the borehole wall 100, appearing in the Lorentz equation.

The first result of the above-described model analysis; the frequency content of the impedance Z is the image of the frequency content of the borehole wall 100. In the other hand, to access to the absolute amplitude of vibration of the borehole wall 100, it is necessary to access to the parameters as follows:

Parameters depending on the geometry of the coil 110, and

Function F written by Equation (82), which is the Hankel inverse transform function.

The function F can be easily computed by a numerical method with geometric parameters and electromagnetic parameters in the space in which the magnetic field is formed. One of important parameters is $$\delta = \frac{1}{\sqrt{\mu_0 \sigma \omega}},$$

which includes the conductivity σ of the borehole wall 100 or the formation 102.

Figure 5:
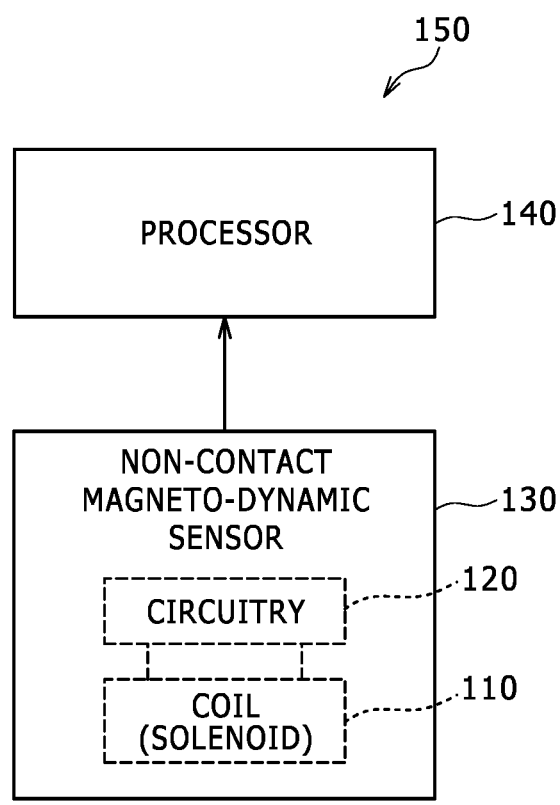
FIG. 5 is a block diagram representation of the configuration of one possible system for non-contact measurement of acoustic signals via a borehole wall using a magneto-dynamic sensor in accordance with embodiments of the present disclosure.

FIG. 5 is a block diagram representation of the configuration of an embodiment of one possible system 150 for non-contacting measurements of acoustic signals via a borehole wall 100 using a magneto-dynamic sensor 130. The system 150 includes at least one magneto-dynamic sensor 130 configured or designed for deployment at at least one depth in a borehole, and a processor 140. The magneto-dynamic sensor 130 may include a coil 110 excited by an electric current and circuitry 120 for outputting a signal corresponding to a time-varying impedance of the coil 110. The circuitry 120 may includes a current source circuit for supplying the input current, for example such as a DC current, and a device for detecting the time-varying impedance of the coil 110. In some cases, the coil 110 may be a solenoid.

The processor 140 may be configured to perform signal processing for deriving at least one of a magnitude or a frequency of vibration of the borehole wall based on the signal corresponding to the time-varying impedance output from the magneto-dynamic sensor 130. The at least one of a magnitude or a frequency of vibration of the borehole wall may be derived by using, for example, Equations (81) and (82) or Equation (77) as discussed in the analytical model. The processor 140 may be one of the elements of the foregoing seismic downhole tool, or may be incorporated in the surface equipment such, as a data acquisition system on the ground. The processor 140 may be a computer capable of executing a set of instructions or codes to perform signal processing for deriving at least one of a magnitude or a frequency of vibration of the borehole wall based on the signal corresponding to the time-varying impedance output from the magneto-dynamic sensor 130.

Embodiments of the system 150 may include a tool configured or designed for deployment at at least one depth in a borehole. The tool may comprise the one or more non-contact magneto-dynamic sensors 130 and a communications interface operably connected to the processor 140. The system 150 may also include one or more sources configured or designed for generating a seismic wavefield. The system 150 may be configured for Vertical Seismic Profile (VSP) data acquisition, crosswell data acquisition or single well data acquisition.

FIG. 6 is a block diagram representation of the configuration of an embodiment of one possible seismic acquisition system with a magneto-dynamic sensor. The acquisition front end 402 may contain the magneto-dynamic sensor 130 including a coil 110 and a circuitry 120 described above, as well as their associated connections and electronics. For example, the acquisition section 402 may include electronics suitable for the relevant or desired frequencies of acoustic signals that are expected to be received by the magneto-dynamic sensor 130. In this, electronics for signal conditioning and digitization may be included as known to those of skill in the art.

The overall operation of the system is coordinated by controller 404. The controller is capable of adjusting the acquisition parameters for section 402 and timing the start and end of acquisition, among its other functions. A real time clock 406 may be used to provide the time to the controller 404 for the determination of when a signal is received and for timing the appropriate collection intervals. This clock's time is used in concert with the time that the seismic signal is generated so that the travel time can be determined. Information from the controller 404 may be sent to an analysis unit 412. In one embodiment, an analysis unit may be located at the surface of the borehole at a platform 214 (refer to FIG. 1). Communications interface 408 may be used to convey the signals output from the controller 404 to communication cable 410, and subsequently to analysis unit 412. The analysis unit 412 may perform adaptive noise cancellation as well as determination of the signal velocity for each data collection, such as in the processor 140 shown in FIG. 5. The functions of the analysis unit 412 may be distributed between modules at the surface and downhole, as desirable or necessary for the operations described herein.

In certain embodiments of the present disclosure, the controller 404 and the analysis unit 412 are configured to measure the depth of the sensor section at any time. One method of accomplishing this is to measure the amount of conveyance that is output by the winch 210 (refer to FIG. 1). Knowing this depth, the seismic sources can be activated with the receivers located at a variety of depths. This allows the system to ensure that measurements are taken at specific depths.

Referring generally to FIG. 7, in one method 500 according to an embodiment of the present disclosure, at least one magneto-dynamic sensor 130 is deployed (positioned) within a borehole at at least one depth (note flow diagram block 502). A suitable seismic source device is activated to generate a seismic wavefield (note block 504). As previously discussed above, the present disclosure also contemplates passive seismic measurements in which seismic energy is generated by, for example, micro earthquakes propagating through subterranean formations as a result of hydraulic fracturing. Seismic measurements are acquired at at least one depth in the borehole (note block 506) to provide seismic information of the formation such that the measured data relate to different zones of interest in the formation. The seismic measurements include deriving at least one of magnitude or frequency of vibration of the borehole wall based on a signal corresponding to the time-varying impedance output from a non-contact magneto-dynamic sensor 130, as discussed in the above-described analytical model.

The acquired data may be processed to determine key reservoir parameters (note block 508) relating to, for example, oil production, gas production, formation structure, among others. As described above, the seismic measurements having translational and rotational components of seismic wavefields may be used to derive anisotropy of the subterranean structures around the receivers and/or shear-wave splitting measurements.

As above-described in the present disclosures, a non-contact method using a non-contact magneto-dynamic sensor including a coil such is developed to measure the velocity vector due to acoustic signals via the bore wall 100. This method, based at least in part on the Lorentz force, allows measuring the change of the coil impedance Z due to the motion of the bore wall 100. Since the effect of the Lorentz force on the impedance is small, an embodiment containing a new method has been developed to enhance the coupling of the wall motion on the electrical impedance, by exciting the coil 110 with a DC current. Indeed, the impedance Z of the coil itself and its interaction with the formation 102 is reduced to zero in order to access the Lorentz force effect due to the motion of the borehole wall 100.

A full analytical method has been developed to demonstrate the measurement of the vector vibration of a borehole wall with a coil excited with a DC current. The solution of the embodiments of the model developed in the present disclosures shows that the impedance Z vibrates at the same frequency that the motion of the borehole wall or the formation around it. The magnitude of the velocity depends on some parameters, like the conductivity of the borehole wall or formation, and other functions which can be computed without difficulties.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

According to one embodiment of this disclosure, comparatively less expensive materials can be modified to exhibit required properties of strength and corrosion resistance sufficient to either equal or exceed current requirements for service.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method of measuring acoustic signals via a borehole wall, comprising:
    deploying a non-contact magneto-dynamic sensor at at least one depth in a borehole, the magneto-dynamic sensor comprising a coil excited by an electric current and a circuitry for outputting a signal corresponding to a time-varying impedance of the coil; and
    deriving at least one of magnitude or frequency of vibration of the borehole wall based on the signal corresponding to the time-varying impedance;
    wherein the electric current supplied to the coil comprises a DC current.

2. The method according to claim 1, wherein deriving is deriving frequency of vibration and the frequency of vibration is derived based on an imaginary part of a sinusoidal component of the time-varying impedance.

3. The method according to claim 1, wherein deriving is deriving magnitude of vibration and the magnitude of vibration is derived based on a real part of a sinusoidal component of the time-varying impedance, at least one geometric parameter and at least one electromagnetic parameter in the space in which the magnetic field is formed.

4. The method according to claim 3, wherein the at least one geometric parameter includes at least one of a radius of the coil or a distance between a center of the coil and the borehole wall.

5. The method according to claim 3, wherein the at least one electromagnetic parameter includes an electrical conductivity of the borehole wall.

6. The method according to claim 1, wherein the coil is a solenoid.

7. The method according to claim 1, wherein the vibration of the borehole wall is generated by a seismic activity due to a natural or controlled event.

8. A system of measuring acoustic signals via a borehole wall, comprising:
    one or more non-contact magneto-dynamic sensors configured or designed for deployment at at least one depth in a borehole, the magneto-dynamic sensor comprising a coil excited by an electric current and a circuitry for outputting a signal corresponding to a time-varying impedance of the coil; and
    a processor configured to perform signal processing for deriving at least one of magnitude and frequency of vibration of the borehole wall based on the signal corresponding to the time-varying impedance;
    wherein the electric current supplied to the coil includes a DC current.

9. The system according to claim 8, wherein deriving is deriving frequency of vibration and the frequency of vibration is derived based on an imaginary part of a sinusoidal component of the time-varying impedance.

10. The system according to claim 8, wherein deriving is deriving magnitude of vibration and the magnitude of vibration is derived based on a real part of a sinusoidal component of the time-varying impedance, at least one geometric parameter, and at least one electromagnetic parameter in the space in which the magnetic field is formed.

11. The system according to claim 10, wherein the at least one geometric parameter includes at least one of a radius of the coil or a distance between a center of the coil and the borehole wall.

12. The system according to claim 10, wherein the at least one electromagnetic parameter includes an electrical conductivity of the borehole wall.

13. The system according to claim 8, wherein the coil is a solenoid.

14. The system according to claim 8, wherein the vibration of the borehole wall is generated by a seismic activity due to a natural or controlled event.

15. The system according to claim 8, further comprising:
a tool configured or designed for deployment at at least one depth in a borehole, the tool comprising the one or more non-contact magneto-dynamic sensors; and
a communications interface operably connected to the processor.

16. The system according to claim 15, further comprising one or more sources configured or designed for generating a seismic wavefield.

17. The system according to claim 15, wherein the system is configured for Vertical Seismic Profile (VSP) data acquisition.

18. The system according to claim 15, wherein the system is configured for crosswell data acquisition or single well data acquisition.

* * * * *